Dec. 13, 1949  T. M. O'HARA  2,491,202
POWER TRANSMISSION
Filed Dec. 6, 1946
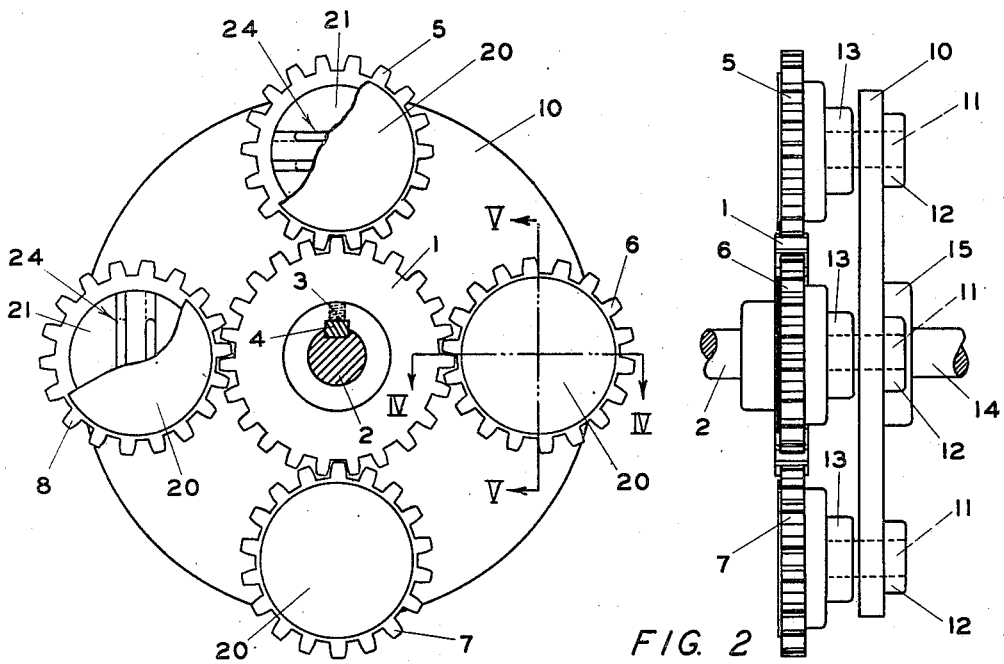
FIG. 1
FIG. 2
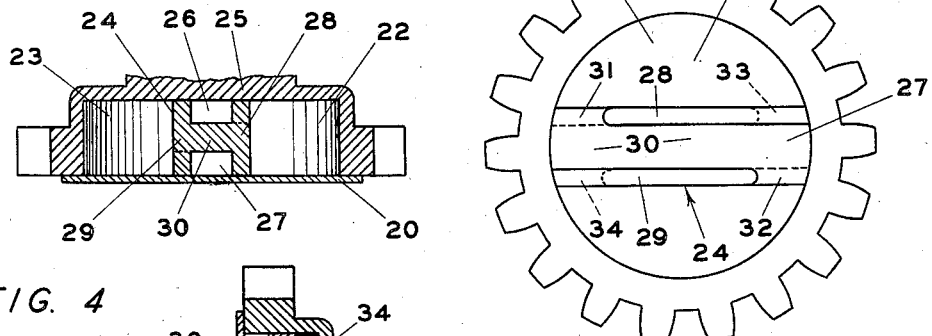
FIG. 4
FIG. 3
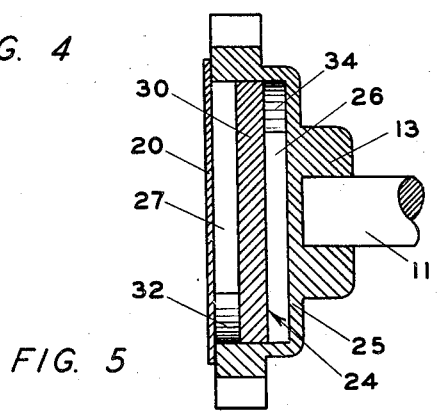
FIG. 5
INVENTOR
THOMAS M. O'HARA
BY
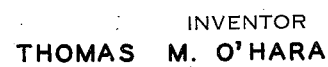
ATTORNEY Patented Dec. 13, 1949

2,491,202

UNITED STATES PATENT OFFICE 2,491,202

POWER TRANSMISSION

Thomas M. O'Hara, Detroit, Mich.

Application December 6, 1946, Serial No. 714,551

6 Claims. (Cl. 74—752)

This invention relates to a variable speed, power transmission mechanism, and more specifically to a type thereof in which the speed of the driven member may vary automatically with respect to the speed of the driving member under changing conditions of load and/or speed.

Heretofore, manufacturers of internal combustion engines utilizing the gear type transmission, particularly in the field of automobiles, have been limited in manufacture to a type of transmission involving a series of variously sized gears by which a few fixed ratios could be established between the driving and driven means. This type of mechanism usually requires some kind of lever device for altering the engagement of said various gears whenever a change in ratio is desired. Such a method of changing the speed ratio between said driving and driven means has been unsatisfactory to use as well as expensive to manufacture or replace.

Numerous attempts have been made to devise a transmission for effecting a suitable association between the driving means and the driven means, involving spring balanced or counterweighted levers, cam tracks, rollers, and similar means for the purpose of absorbing the shock and lag between said driven and driving members. Such attempts have never been found highly practicable and, as a result, have not come into common useage because they involve mechanical parts whose rate of deterioration due to wear would be prohibitive under normal operating conditions.

Consequently, it is my intention to provide a transmission, particularly for automotive application, in which a driven gear, suitably engaged by a plurality of driving gears, will be compelled to rotate by said driving gears without involving the above mentioned difficulties.

Accordingly a major object of this invention is to provide an automatic, variable speed, power transmission which will eliminate the necessity of shifting gears to obtain various speed ratios between the driving means and the driven means.

A further object of this invention is to provide a power transmission device as aforesaid which is particularly adaptable to automotive applications.

A further object of this invention is to provide a power transmission as aforesaid which involves a minimum of moving parts and reduces wear in normal usage to a negligible amount.

A further object of this invention is to provide a power transmission as aforesaid which is comparatively simple and economical to manufacture and maintain.

A further object of this invention is to provide a power transmission as aforesaid which eliminates the jerky, noisy and tiresome characteristics of a conventional gear type transmission.

Further objects and purposes of this invention will become apparent to persons familiar with this type of equipment upon referring to the accompanying drawings and upon reading the following specification.

In the drawings:

Figure 1 is a front elevational view of the working parts of one embodiment of a variable speed power transmission unit as it appears from the driven side.

Figure 2 represents a side elevational view of the variable speed, power transmission unit shown in Figure 1.

Figure 3 is an enlarged view of one of the planetary gears shown in Figure 1 exposing the cavity there within.

Figure 4 is a sectional view along the line IV—IV in Figure 1.

Figure 5 is a sectional view taken along the line V—V in Figure 1.

In providing an automatic, variable speed, power transmission device meeting the objects and purposes heretofore mentioned, as well as others incidental thereto and associated therewith, I have devised a mechanism in which a driven gear is engaged at its periphery by a plurality of so called planetary gears which are in turn rotatably mounted upon a common disk which is rotatably associated with any suitable driving means, such as the crank shaft of an internal combustion engine. Said planetary gears are constructed with a concentric cavity suitably partitioned and containing one or more fluids, sealed therein. When the driving means effects a rotation of the disk upon which is mounted the said planetary gears, said gears will be urged to rotate about their own axes due to the engagement of their teeth with the teeth of the driven gear, which is centrally located between them and which resists rotation with respect to the axes of said planetary gears because of the load which may be imposed on said driven gear.

However, as the rotational speed of the disk, upon which said planetary gears are rotatably mounted, is increased, the said partitions cause an increasing amount of impedence to the free flow of fluid or fluids within the cavities of said planetary gear. Consequently said planetary gears will tend to resist rotation and thereby cause the centrally located, driven gear to rotate in the direction of rotation of said disk. Said driven gear may thus be caused to rotate at a speed less than or equal to, the speed of rotation of said disk depending upon the conditions of load and speed.

Referring now to the drawings, it may be observed in Figure 1 that a driven gear 1 of any convenient size and type and provided in a conventional manner with teeth about its periphery, is suitably secured to the driven shaft 2 as, for example, by means of the set screw 3 in conjunction with the key and keyway 4. In the case of an automotive application, said gear would normally be mounted on the transmission end of the drive shaft. Said driven gear 1 is engaged by a plurality of planetary gears, here shown as four for illustrative purposes only, and indicated in Figure 1 at 5, 6, 7 and 8. Although the said driven gear is here shown as engaged about its periphery by said planetary gears, it will be understood that the driven gear 1 may also be a ring gear placed externally of the planetary gears.

Said planetary gears are suitably mounted on shafts 11 which extend through the disk 10, as illustrated more clearly in Figure 2, where they may be rotatably associated with any suitable bearing mechanisms 12. Said shafts 11 are secured to the planetary gears by means of hubs 13, attached thereto. The disk 10 is in turn supported on a shaft 14 by means of a hub 15 provided with suitable securing means, such as a key, key way and set screw (not shown). Shaft 14 is the driving shaft and may be associated through suitable clutching means with the crank shaft of the driving means.

In Figure 1 it will be noted that there is provided within each planetary gear a cavity 21 which is covered by means of a removable cover plate 20 so as to produce a secure seal. This cover plate may be secured to said planetary gear by bolting, welding or other suitable means. The cavity may also be provided in an independent member, which may be secured to the gear as a detachable hub, or in any other convenient manner, providing only that the hereinafter mentioned partitions located therein are caused to rotate with the planetary gear, though not necessarily at its same speed. In the form shown, the cover plate 20 has been removed from the gear appearing in the enlarged view of Figure 3 thereby exposing the compartment cavity which is to be found within each of such gears. Preferably, the cavity 21 is cylindrical in shape, is coaxial with the entire gear, and is partitioned into two separate compartments, 22 and 23. The partitioning is accomplished in this particular embodiment of the invention by means of a suitable structural member, in the form of an I-beam, indicated at 24 in Figures 3, 4 and 5, whose flanged edges bear securely against the cover plate 20 on the one side and against the bottom of the cavity 21 in the planetary gear on the other side. The ends of said structural partitioning member 24 bear securely, as shown in Figure 3, against the cylindrical side-walls of the cavity 21.

The flanges 28 and 29 of the partitioning member 24 are conveniently relieved, as will hereinafter be described, thereby providing suitable channels between the compartments 22 and 23, through the parallel passageways 26 and 27 shown in Figures 4 and 5.

For the purposes of this particular embodiment of the invention, and as appearing in Figure 3, the flange 28 is relieved between the web 30 and the cover plate 20 (not shown in Figure 3) to provide an opening 31 from the compartment 22 into the passageway 27. The flange 29 is relieved at the opposite end of said structural partitioning member 24 between the web 30 and said cover plate 20 to provide an opening 32 from the passageway 27 into the compartment 23. Consequently, one channel of communication between the compartment 22 and the compartment 23 comprises the opening 31, the passageway 27, and the opening 32.

The flange 28 is also relieved between the web 30 and the bottom 25 of the cavity 21 to provide, at the opposite end from and diagonal to the opening 31, an opening 33 from the compartment 22 to the passageway 26. The flange 29 is relieved at the end opposite from and diagonal to the opening 32 in said flange 29, between the web 30 and the bottom 25 of said cavity 21 to provide an opening 34 between the compartment 23 and the passageway 26. Consequently, another channel of communication between the compartments 22 and 23 comprises the opening 33, the passageway 26, and the opening 34.

For purposes of illustration only, it will be assumed that the particular embodiment of the subject invention, whose operation will hereinafter be described, applies to the transmission of an automobile. Accordingly, the shaft 14, as aforesaid, will be operably associated with an engine, thereby establishing the planetary gears 5, 6, 7 and 8 as the driving gears. Again, as heretofore described, the teeth of four such planetary gears, which are suitably attached to and uniformly disposed around said disk 10, engage the teeth of the driven gear 1. The cut away portion of the gear cover 20 on the gears 5 and 8 (Figure 1) reveals that the planetary gears are preferably synchronized with respect to each other in such a manner that their structural partitioning members will be perpendicularly disposed to the extended radii of the driven gear at the said time. This synchronization arises from the fact that each of the gears is equally spaced about the driven gear 1 and when the planetary gears are assembled to the driven gear 1, the partitioning member 24 in each planetary gear is positioned perpendicular to a line connecting the centers of said gears.

It is theoretically possible that the cavities 21 could be completely evacuated and partially filled with one liquid. However, this being seldom practicable the said cavities will normally contain at least two fluids, one of which may conviently be air. Such fluids must of necessity be of dissimilar densities. For purposes of description, it will be assumed that the said cavities in each of the said planetary gears will be approximately two thirds filled with some suitable liquid such as oil, the remaining third of said cavities being filled with air.

When the disk 10, to which said planetary gears are attached, is at rest, the heavier fluid, here oil, within said gear cavities, will settle to the bottom thereof leaving the lighter fluid, here air, trapped at the top of said cavities. When said disk 10, as shown in Figure 1, is caused to rotate in a clockwise direction, the planetary gears will be caused to rotate about their individual axes, also in a clockwise direction, because of their association with the driven gear 1, which tends to remain at rest as a result of the load of the driven mechanism. At low speeds of the disks, such as the idling speed of an automobile engine, the planetary gears will rotate with reasonable freedom about their own axes and produce little impedance to such rotation as they are in turn carried through a larger arc of revolution by means of the disk upon which they are individually, rotatably mounted. However, as the disk 10 is caused to increase its rate of rotation, centrifugal force will tend to throw the heavier fluid toward that side of the cavity which is on the outside of rotation with respect to the axis of the disk 10. The tendency for the oil to remain against the side wall of the cavity, which is, as aforesaid, on the outside of rotation of the disk 10, will be opposed by the tendency of the planetary gear itself, to rotate due to its engagement with the driven gear 1. Therefore, since the partitions 24 prevent the heavier fluid from moving about freely within the cavities 21, a point will be reached at which the resulting impedance set up within said planetary gears will cause them to overcome the driven gear's resistance to rotation. The disk 10 will subsequently reach a speed of rotation at which the centrifugal force acting upon the heavier fluid within the planetary gear cavities will become so great that the planetary gears will practically cease rotating and, as a result, tend to rotate the driven gear 1, with which they are engaged, at a rotational speed comparable to the speed of the disk.

As the resistance to rotation produced by the driven gear 1, due to the load which is attached thereto, as said driven gear is brought up to and held approximately at the angular speed of the disk 10, is varied from time to time and sometimes suddenly, the mechanism will be cushioned against shock resulting from such changes in load by the slippage of said planetary gears. This slippage is made possible by the flow of the heavier fluid through the openings and passages, heretofore described in connection with Figure 3, between the two compartments in each said planetary gear cavity. This flow and resultant slippage will be proportional to the load of the driven means.

For example in Figure 3, if the planetary gear viewed therein is caused to rotate in a clockwise direction about its axis, because of its engagement with the driven gear 1 which it is attempting to drive, while at the same time the heavier fluid within the cavity 21 is being held in compartment 22 by means of the centrifugal force, as above mentioned, a variable but appreciable amount of rotation of said planetary gear would be permitted. The heavier fluid would escape through the opening 31, down the passage 27, and out through the opening 32 into the compartment 23. At the same time, the air trapped in compartment 23 would escape through the opening 34, down the passage 26, and out through the opening 33 into the compartment 22 to fill the space vacated by the oil. In this manner the oil, depending upon the size of the openings 31, 32, 33 and 34 and the passageways 26 and 27, would be permitted to move from one compartment to the other and thereby permit a degree of slippage. It is this slipppage which would cushion sudden changes in power demands placed upon the driving means by the driven means, and would permit the driving means to rotate at a greater speed than the driven means, at least in the lower speed ranges. Said slippage also permits the disk and associated driving means to rotate at a slower speed than the drive shaft and associated driven means when the said driving engine is being decelerated while still clutched to the said disic.

In general, it will be observed that the partitioning member 24 sets up an impedance to the free flow of the fluids placed within the cavity 21. The centrifugal force caused by the rotation of the disk 10 will tend to hold the heavier liquids to one side of the planetary gear cavities. Thus, the said planetary gears will tend to resist rotation as the speed of the disk 10 increases because of said impedance to the flow of the heavier liquid within said cavity 21 created by the said partitioning member 24.

It is this restraint to the free rotation of said planetary gears which will be translated into the rotation of said center, driven gear, as shown in Figure 1.

Many variations may be made in the partitioning member 24 such as, for example, the size of the passageways 26 and 27, the size of the openings 31, 32, 33 and 34 in said partitioning member, as well as the size of the cavity and compartments in the planetary gear itself. Furthermore, considerable variation may be resolved by convenient choice of fluids of varying densities. Under some conditions, it may be found advisable to use two liquids, as oil and mercury rather than a liquid and air, due to the compressibility of air, which use may be made without departure from the scope of the invention.

As shown in Figure 3, the planetary gear may rotate in a counter-clockwise direction as well in a clockwise direction and produce substantially the same effects.

It will be undertsood that the above mentioned factors, as well as the many other variable factors which are involved, may be changed freely without departing from the original scope and intentions of this invention, and devices including such variations will be within the terms of the following claims excepting as said claims may by their own terms expressly provide otherwise.

I claim:

1. In a power transmission mechanism the combination comprising: rotatable driven means and a driven gear operatively associated therewith; a plurality of planetary gears peripherally engaging said driven gear; a disk relatively larger in diameter than, and coaxial with, said driven gear and driving means operatively associated therewith; said planetary gears being rotatably mounted and uniformly disposed on that side of said disk adjacent to said driven gear and at equal radial distances from the axis of said disk; a recess within at least one of said planetary gears and a partitioning diametric member dividing said recess into at least two equal compartments, said partitioning member having at least two independent passageways provided with predetermined restrictions providing communication between said compartments; at least two fluids of dissimilar densities within said recess of said one of said planetary gears, which fluids will dispose themselves within said recess and passageways with the fluid of greater density disposed radially outermost from the axis of said disk when the said disk is caused to rotate beyond predetermined limits so as to impede the tendency of the said planetary gears to rotate and thereby urge the driven gear, with which they are engaged, to rotate with said disk.

2. In a power transmission mechanism, the combination comprising: a driven means rotatably mounted; a plurality of driving pinions peripherally engaging said driven means; driving means and a disk operatively associated therewith, said disk being coaxial with said driven means and said driving pinions being rotatably mounted on said disk and uniformly disposed on that side of said disk adjacent to said driven means and at equal radial distances from the axis of said disk; a recess within at least one of said plurality of driving pinions, a partition member dividing said recess into at least two compartments, said partition member being channeled to provide at least two independent restricted passageways between said compartments; a quantity of fluid within said recess of said one of said driving pinions and filling at least a part but not all of said recess, which fluid will impede the rotation of said driving pinions when said disk is rotated at speeds beyond a predetermined limit.

3. In power transmission means having a rotatable driving shaft and a rotatable driven shaft concentric therewith, a driven gear mounted on said driven shaft for rotation therewith, a planetary gear peripherally engaging said driven gear and mounted for rotation on its own axis and for orbital revolution around the axis of the driving and driven shafts as said driving shaft is rotated, the improvement in said power transmission comprising: a cavity within said planetary gear and means dividing said cavity into a plurality of chambers and defining restricted passageways between said chambers, and at least two fluids of dissimilar densities filling said recess, which fluids will dispose themselves within said cavity with the fluid of greater density disposed in the chamber radially outermost from the axis of said driving and driven shafts when said planetary gear is caused to rotate at a speed beyond predetermined limits so as to impede the tendency of the said planetary gear to rotate and thereby urge the driven gear to rotate with said planetary gear.

4. In power transmission means having a rotatable driving shaft and a rotatable driven shaft concentric therewith, a driven gear on said driven shaft for rotation therewith, a planetary gear peripherally engaging said driven gear and mounted for rotation on its own axis and for orbital revolution around the axis of the driving and driven shafts as said driving shaft is rotated, the improvement in said power transmission means comprising: a cavity within said planetary gear and means dividing said cavity into a plurality of communicating chambers interconnected at their radially outermost extremities, and a fluid filling a portion of said cavity which fluid will dispose itself within said cavity radially outermost from the axis of said driving and driven shafts when said planetary gear is caused to rotate at a speed beyond predetermined limits so as to impede the tendency of said planetary gear to rotate and thereby urge the driven gear to rotate with said planetary gear.

5. A power transmission means having a driven gear peripherally engaged by at least one driving gear mounted for orbital revolution about the axis of said driven gear, the improvement in said power transmission means comprising: a cavity within said driving gear; means dividing said cavity into a plurality of chambers; means providing restricted communication between said chambers at their radially outermost extremities and a fluid filling a portion of said cavity which fluid will dispose itself within said cavity radially outermost from the axis of said driving and driven shafts when said planetary gear is caused to rotate at a speed beyond predetermined limits so as to impede the tendency of said planetary gear to rotate and thereby urge the driven gear to rotate with said planetary gear.

6. In a power transmission mechanism, the combination comprising: a driven means rotatably mounted; at least one driving pinion peripherally engaging said driven means; driving means and a disk operatively associated therewith, said disk being coaxial with said driven means and said driving pinion being rotatably mounted on said disk on that side of said disk adjacent to said driven means; a recess within said driving pinion, a partition member dividing said recess into a plurality of compartments, said partition member being channeled to provide at least two independent restricted passageways between each of said compartments and communicating with said compartments at the radially outermost extremities of said compartments; a quantity of fluid within said recess and filling a part but not all of said recess, which fluid will impede the rotation of said driving pinions when said disk is rotated at speeds beyond a predetermined limit.

THOMAS M. O'HARA.

REFERENCES CITED

The following references are of record in the file of this patent:

UNITED STATES PATENTS

| Number | Name | Date |
|---|---|---|
| 1,551,695 | Reece et al. | Sept. 1, 1925 |
| 1,691,611 | Reece et al. | Nov. 13, 1928 |
| 1,720,236 | Reece et al. | July 9, 1929 |